(12) United States Patent
Yamada et al.

(10) Patent No.: US 12,337,689 B2
(45) Date of Patent: Jun. 24, 2025

(54) VEHICLE DISPLAY DEVICE

(71) Applicant: YAZAKI CORPORATION, Tokyo (JP)

(72) Inventors: Yoshihisa Yamada, Makinohara (JP); Naoki Ueno, Makinohara (JP); Terukazu Kuboyama, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/900,632

(22) Filed: Sep. 28, 2024

(65) Prior Publication Data

US 2025/0018794 A1    Jan. 16, 2025

Related U.S. Application Data

(63) Continuation of application No. PCT/JP2023/033706, filed on Sep. 15, 2023.

(30) Foreign Application Priority Data

Sep. 27, 2022  (JP) ................. 2022-154025

(51) Int. Cl.
*B60K 35/22*  (2024.01)
*G06F 3/14*  (2006.01)

(52) U.S. Cl.
CPC ............ *B60K 35/22* (2024.01); *G06F 3/1446* (2013.01)

(58) Field of Classification Search
CPC ........ B60K 35/00; B60K 35/22; B60K 35/60; B60K 2360/27; B60K 2360/336; B60K 2360/343; B60K 2360/693; B60K 35/23; B60K 35/80; B60K 2360/334; G06F 3/1446; G09F 9/00; G02B 27/01; G02B 27/0101; G02B 2027/0118; G02F 1/13318; G02F 1/13312; G02F 1/133512; G02F 1/133514; G02F 1/133528; G02F 1/133541; G02F 1/136227; G02F 1/1368; G02F 2201/58

See application file for complete search history.

(56) References Cited

U.S. PATENT DOCUMENTS

2018/0267307 A1*  9/2018  Yoshida ................. B60K 35/00
2023/0017713 A1*  1/2023  Yoshida ................. G09G 3/342

FOREIGN PATENT DOCUMENTS

JP    2015-143710 A    8/2015

\* cited by examiner

*Primary Examiner* — Nelson M Rosario
(74) *Attorney, Agent, or Firm* — KENEALY VAIDYA LLP

(57) ABSTRACT

A vehicle display device includes a first display unit and at least one second display unit. The first display unit includes an image display device that displays an image on a display surface of a surface, the second display unit includes a display plate portion disposed along a second display area on the cover glass, and a light guide portion including a light guide member that guides light from a light source and radiates the light to the display plate portion. The light guide member of the light guide portion is supported by a case, and protrudes between an edge portion of the image display device and the cover glass. The cover glass includes a gradation portion that is disposed in a position along a boundary with the second display area in a first display area and becomes thinner as getting away from the boundary.

7 Claims, 6 Drawing Sheets

VEHICLE DISPLAY DEVICE

CROSS-REFERENCE TO RELATED APPLICATIONS

This is a continuation of International Application No. PCT/JP2023/033706 filed on Sep. 15, 2023, and claims priority from Japanese Patent Application No. 2022-154025 filed on Sep. 27, 2022, the entire content of which is incorporated herein by reference.

TECHNICAL FIELD

The present disclosure relates to a vehicle display device.

BACKGROUND ART

In recent years, a full graphic meter using a thin film transistor (TFT) liquid crystal display or the like has been frequently adopted as a meter device for a vehicle. However, a meter device including a large liquid crystal display is expensive, and is thus not suitable to be mounted on a low-cost vehicle.

For this reason, as shown in FIG. 6, there is an increasing number of display devices that appear like a full graphic meter with an inexpensive configuration by combining a main display unit 1 including a small or medium-sized TFT liquid crystal display and sub-display units 2 each including a segment-type liquid crystal display (LCD), a dial, or the like.

For example, JP2015-143710A discloses a vehicle meter unit including two ring-shaped meters arranged side by side in a left-right direction and a TFT liquid crystal display device provided between the meters.

The TFT liquid crystal display serving as the main display unit 1 is provided with a bezel 3, which is a frame member, on a peripheral edge thereof. For this reason, a non-display area is defined in the bezel 3 between the main display unit 1 and the sub-display unit 2, display of the main display unit 1 and the sub-display unit 2 becomes discontinuous, and a good seamless feeling is not obtained.

The present disclosure is made in view of the above circumstance, and an object of the present disclosure is to provide a vehicle display device that can display display areas displayed on different display units with a good seamless feeling.

SUMMARY

The above object of the present disclosure is achieved by following configurations.

A vehicle display device includes:
a first display unit configured to display in a first display area on a cover glass; and
at least one second display unit configured to display in a second display area adjacent to the first display area on the cover glass, in which
the first display unit includes an image display device that displays an image on a display surface of a surface,
the second display unit includes
 a display plate portion disposed along the second display area on the cover glass, and
 a light guide portion including a light guide member that guides light from a light source and radiates the light to the display plate portion,
the light guide member of the light guide portion is supported by a case, and protrudes between an edge portion of the image display device and the cover glass, and
the cover glass includes a gradation portion that is disposed in a position along a boundary with the second display area in the first display area and becomes thinner as getting away from the boundary.

According to the present disclosure, it is possible to provide a vehicle display device that can display display areas displayed on different display units with a good seamless feeling.

The present disclosure has been briefly described above. Details of the present disclosure can be further clarified by reading modes (hereinafter, referred to as "embodiments") for carrying out the disclosure to be described below with reference to the accompanying drawings.

DESCRIPTION OF EMBODIMENTS

A specific embodiment of the present disclosure will be described below with reference to the drawings.

Figure 1:
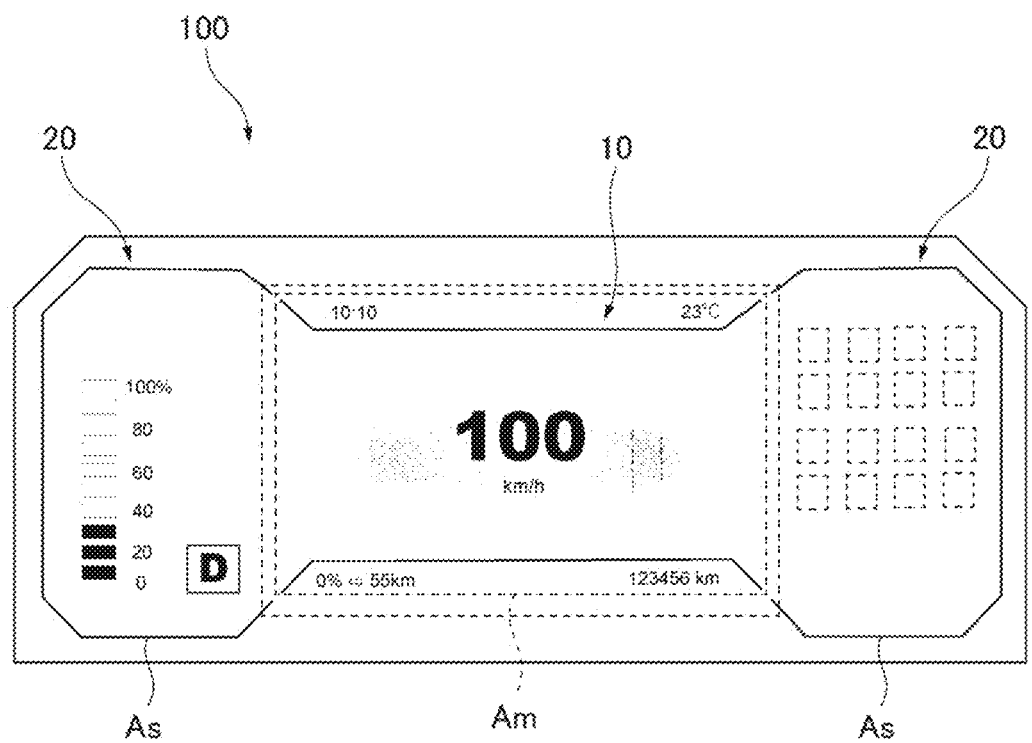
FIG. 1 is a schematic front view of a vehicle display device according to an embodiment.

FIG. 1 is a schematic front view of a vehicle display device according to an embodiment.

As shown in FIG. 1, a vehicle display device 100 according to the present embodiment is mounted on a vehicle such as an automobile. The vehicle display device 100 is used as an instrument panel or the like, and displays various types of information related to the vehicle.

The vehicle display device 100 includes a main display unit (first display unit) 10 and sub-display units (second display units) 20. The main display unit 10 is disposed at a center of the vehicle display device 100, and the sub-display units 20 are disposed on two sides of the main display unit 10. A speedometer or the like is displayed on the main display unit 10, and a tell-tale or the like is displayed on the sub-display unit 20.

The vehicle display device 100 has a display area divided into a main display area (first display area) Am that is an area displayed by the main display unit 10 and sub-display areas (second display areas) As that are areas displayed by the sub-display units 20.

Figure 2:
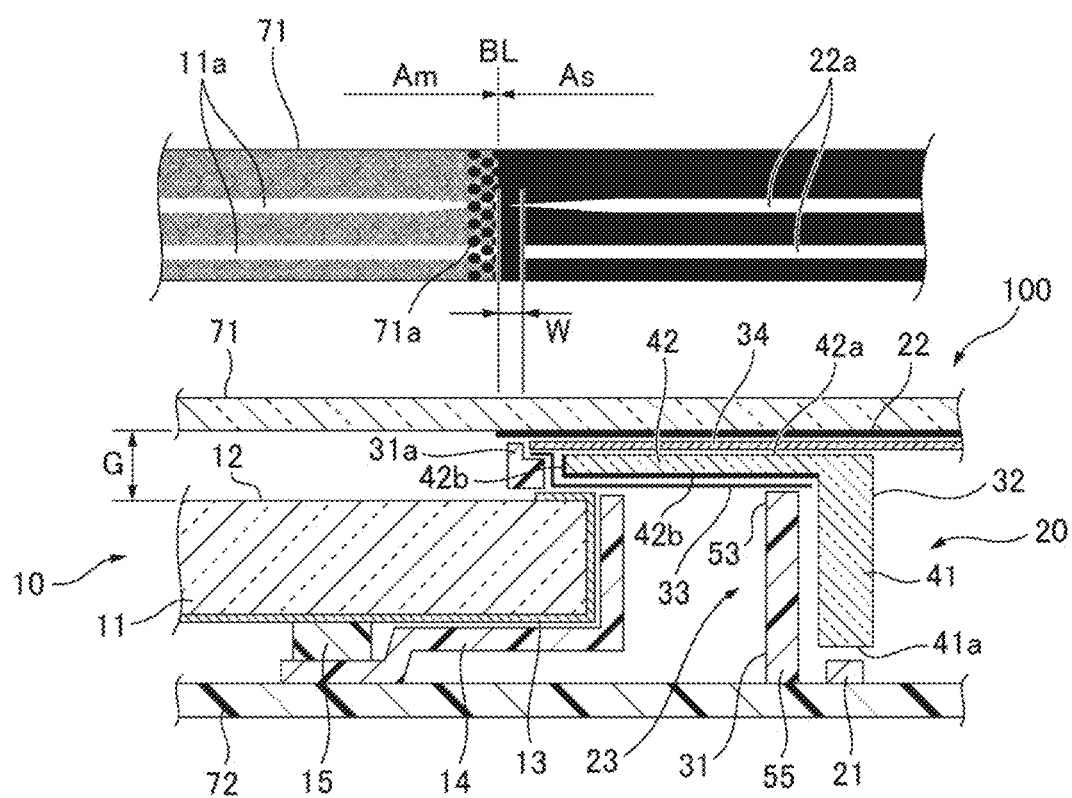
FIG. 2 schematically shows a plan view and a section of the vehicle display device according to the present embodiment.

FIG. 2 schematically shows a plan view and a section of the vehicle display device according to the present embodiment.

As shown in FIG. 2, the vehicle display device 100 has a front side covered with cover glass 71, rearward of which a wiring board 72 is disposed. The cover glass 71 has a gradation portion 71a provided by printing or the like along a boundary BL between the main display area Am and the sub-display area As. The gradation portion 71a is provided on a main display area Am side, and has a pattern, design, or the like that becomes thinner as getting away from the boundary BL.

The main display unit 10 includes a TFT liquid crystal display (image display device) 11. The TFT liquid crystal display 11 has a display surface 12 on a cover glass 71 side, and an image is displayed on the display surface 12. In this example, the TFT liquid crystal display 11 displays a linear image 11a.

The TFT liquid crystal display 11 includes a bezel 13, which is a frame member, and a rear surface, a peripheral surface, and a peripheral edge of the display surface 12 are covered with the bezel 13. Accordingly, in the TFT liquid crystal display 11, the peripheral edge of the display surface 12 that is covered with the bezel 13 is a non-display part at which a displayed image is not projected to the cover glass 71 side.

The TFT liquid crystal display 11 is supported on the wiring board 72 by a holder 14 and a fixing member 15. The TFT liquid crystal display 11 faces the cover glass 71 with a gap G between the cover glass 71 and the display surface 12.

The sub-display unit 20 includes a light source 21, a display plate portion 22, and a light guide portion 23. The light source 21 is, for example, a light emitting diode (LED), and is installed on the wiring board 72. The display plate portion 22 is disposed along a back surface of the cover glass 71. An edge portion of the display plate portion 22 is disposed at the boundary BL between the main display area Am and the sub-display area As. That is, the boundary BL between the main display area Am and the sub-display area As is constituted by the edge portion of the display plate portion 22.

The display plate portion 22 displays characters, patterns, and the like displayed on the sub-display unit 20. In this example, the display plate portion 22 has a linear display 22a. The display plate portion 22 may be printed on the back surface of the cover glass 71.

The light guide portion 23 is provided between the cover glass 71 and the wiring board 72. The light guide portion 23 guides light of the light source 21 to the cover glass 71 provided with the display plate portion 22 on the back surface thereof. Accordingly, the linear display 22a of the display plate portion 22 is displayed in the sub-display area As by the light of the light source 21 guided by the light guide portion 23.

The light guide portion 23 includes a case 31, a light guide member 32, a reflection sheet 33, and a viewing angle control film 34. The light guide member 32, the reflection sheet 33, and the viewing angle control film 34 are provided in the case 31.

The light guide member 32 is formed of a material having transparency such as glass and a resin such as acrylic, polycarbonate, polystyrene, or urethane. The light guide member 32 is formed in an L-shape in a side view, including a light incident portion 41 and a light emitting portion 42. In the light guide member 32, an end surface of the light incident portion 41 is a light incident surface 41a, and one surface of the light emitting portion 42 is a light emitting surface 42a. The light incident surface 41a faces the light source 21, and the light emitting surface 42a faces the cover glass 71 provided with the display plate portion 22. The light guide member 32 guides light from the light source 21 incident from the light incident surface 41a and emits the light from the light emitting surface 42a. The light emitting portion 42 of the light guide member 32 has an end surface thereof, as well as a surface opposite to the light emitting surface 42a, serving as a grained scattering surface 42b. The scattering surface 42b scatters the guided light and guides the light to the light emitting surface 42a.

The reflection sheet 33 is disposed on a back side of the light emitting portion 42 of the light guide member 32. Accordingly, in the light emitting portion 42 of the light guide member 32, the grained scattering surface 42b is covered with the reflection sheet 33. The reflection sheet 33 reflects light leaking from the scattering surface 42b of the light emitting portion 42 toward the cover glass 71.

The viewing angle control film 34 is a resin film having directivity of directing transmitted light in a specific direction. The viewing angle control film 34 is disposed along the light emitting surface 42a of the light emitting portion 42 of the light guide member 32. The viewing angle control film 34 transmits light emitted from the light emitting surface 42a of the light emitting portion 42 of the light guide member 32 only to a driver side.

Figure 3:
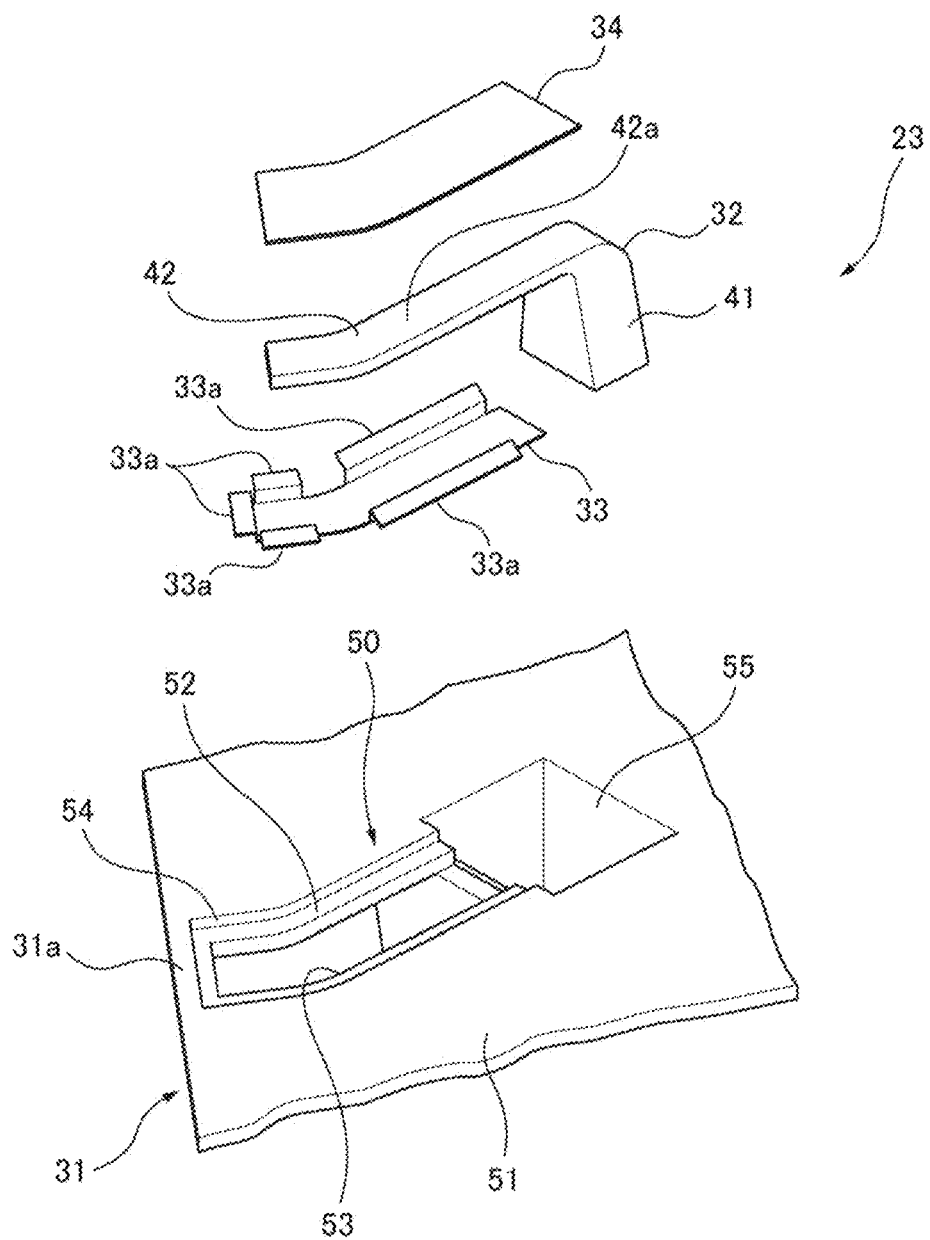
FIG. 3 is an exploded perspective view of a light guide portion that shows a structure of the light guide portion.

FIG. 3 is an exploded perspective view of a light guide portion that shows a structure of the light guide portion.

As shown in FIG. 3, the case 31 includes a flat plate portion 51 on which a mounting portion 50 is formed, and the reflection sheet 33, the light guide member 32, and the viewing angle control film 34 are assembled to the mounting portion 50 in this order. The case 31 is formed of a resin and is black.

In the mounting portion 50, the flat plate portion 51 has a recessed portion 54 in which an opening 53 is formed in a bottom portion 52. The reflection sheet 33 is fitted into the opening 53 of the recessed portion 54. The reflection sheet 33 is formed with a locking piece 33a at an outer edge part thereof, and is assembled to the case 31 in a state of being fitted into the opening 53 by the locking piece 33a locking the bottom portion 52 of the recessed portion 54. The mounting portion 50 has a tubular portion 55 in a position corresponding to an end portion of the recessed portion 54. Into the tubular portion 55, the light incident portion 41 of the light guide member 32 is inserted. In a state in which the light incident portion 41 is inserted into the tubular portion 55, the light emitting portion 42 is superimposed on the reflection sheet 33 fitted into the opening 53, so that the light guide member 32 is fitted into the recessed portion 54. Accordingly, the light guide member 32 is mounted on the mounting portion 50 of the case 31. Further, in the mounting portion 50, the viewing angle control film 34 is fitted into the recessed portion 54 in which the reflection sheet 33 and the light emitting portion 42 of the light guide member 32 are disposed. Accordingly, the viewing angle control film 34 is mounted on the mounting portion 50 of the case 31 in a state of being superimposed on the light emitting portion 42 of the light guide member 32.

In the vehicle display device 100 configured as described above, a portion of the light guide portion 23 constituting the sub-display unit 20 protrudes between an edge portion of the TFT liquid crystal display 11 constituting the main display unit 10 and the cover glass 71 (see FIG. 2). Specifically, the light guide portion 23 protrudes to a range slightly exceeding a non-display range covered with the bezel 13 of the TFT liquid crystal display 11, into which an edge portion 31a of the case 31 constituting the light guide portion 23, a portion of the light emitting portion 42 of the light guide member 32, a portion of the reflection sheet 33, and a portion of the viewing angle control film 34 are inserted.

In the vehicle display device 100, a range of an interval W between an edge portion of the viewing angle control film 34, which is an edge portion of a range in which the light guide portion 23 can be radiated, and the boundary BL constituted by the edge portion of the display plate portion 22 is the non-display range. That is, in the vehicle display device 100, the linear image 11a displayed in the main display area Am and the linear display 22a displayed in the sub-display area As are connected and displayed with the non-display range of the small interval W in between, and a good seamless feeling is obtained.

In the vehicle display device 100, the linear image 11a displayed in the main display area Am and the linear display 22a displayed in the sub-display area As may be tapered as approaching the boundary BL. Accordingly, the non-display range of the small interval W becomes even less noticeable. In addition, by providing, to the linear image 11a and the linear display 22a, a gradation in which brightness gradually changes to a dark color or a gradation in which hue or saturation changes as approaching the boundary BL, tip end parts of the linear image 11a and the linear display 22a may be naturally connected to the non-display range, and the seamless feeling of display at the interval W may be further improved.

Here, a vehicle display device according to a reference example will be described.

Figure 4:
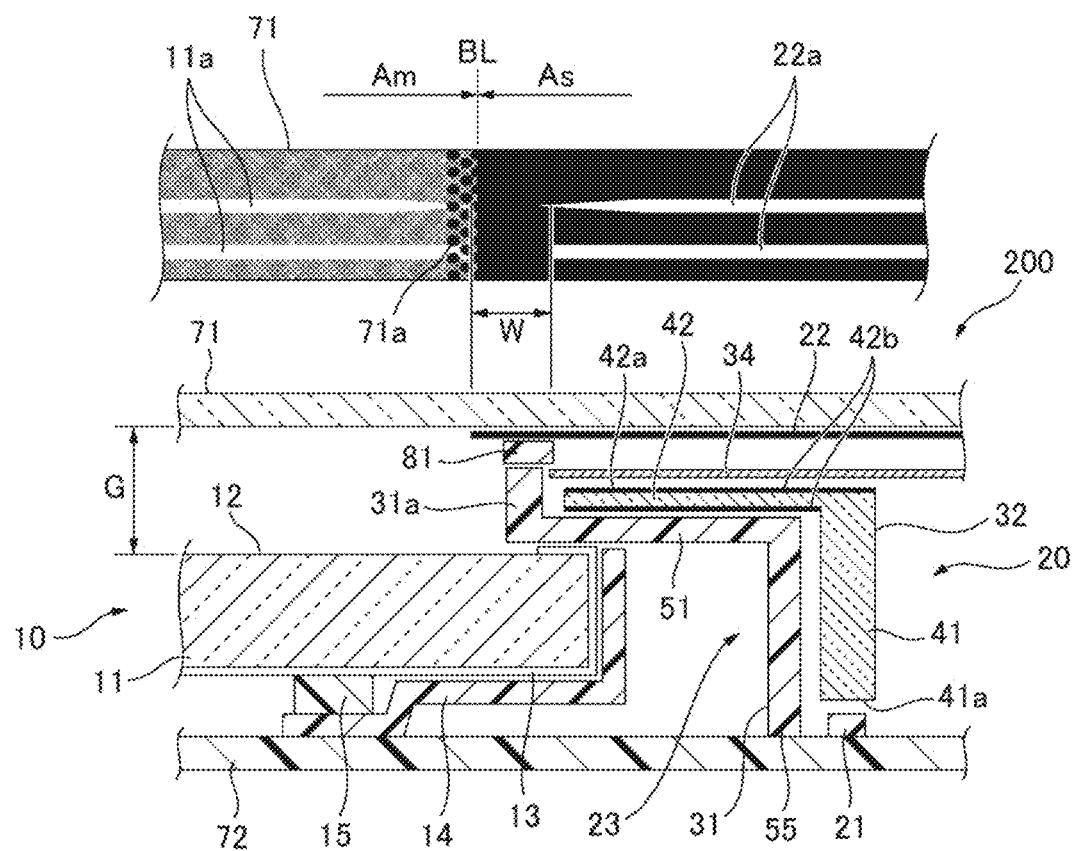
FIG. 4 schematically shows a plan view and a section of a vehicle display device according to a reference example.

FIG. 4 schematically shows a plan view and a section of the vehicle display device according to the reference example.

As shown in FIG. 4, in a part of the light guide portion 23 that protrudes between an edge portion of the TFT liquid crystal display 11 and the cover glass 71 in a vehicle display device 200 according to the reference example, a packing 81 is interposed between the edge portion 31a of the case 31 and the cover glass 71 provided with the display plate portion 22. The case 31 of the light guide portion 23 is white.

In the reference example, the light guide portion 23 does not include the reflection sheet 33. Further, the recessed portion 54 is not formed in the flat plate portion 51 of the case 31 of the light guide portion 23, and the light emitting portion 42 of the light guide member 32 overlaps the flat plate portion 51. The light emitting portion 42 of the light guide member 32 is not grained at an end surface thereof, and both front and back surfaces thereof are grained scattering surfaces 42b.

In the reference example, since the packing 81 is interposed between the case 31 and the cover glass 71 in the part protruding between the edge portion of the TFT liquid crystal display 11 and the cover glass 71, a large gap G is defined between the display surface 12 of the TFT liquid crystal display 11 and the cover glass 71. Further, since the flat plate portion 51 of the case 31 does not have the recessed portion 54 that accommodates the light emitting portion 42, the flat plate portion 51 is interposed in a thickness direction, and the gap G between the display surface 12 of the TFT liquid crystal display 11 and the cover glass 71 is larger. For this reason, a large step is generated in display between the main display unit 10 and the sub-display unit 20, and a seamless feeling deteriorates.

In the reference example, since the case 31 is white, light entering inside through the cover glass 71 is reflected by the case 31, and a boundary part of an edge portion of the case 31 and the case 31 itself become conspicuous.

In the reference example, since the packing 81 is provided, the reflection sheet 33 is not provided, and the end surface of the light emitting portion 42 of the light guide member 32 is not grained, a light guiding effect of light from the light emitting portion 42 to the main display area Am is reduced. Accordingly, the interval W that is a non-display range between the image 11a of the main display area Am and the display 22a of the sub-display area As is large, and it is difficult to obtain a good seamless feeling between the image 11a and the display 22a.

According to the vehicle display device 100 in the present embodiment, light of the light source 21 can be guided between the edge portion of the TFT liquid crystal display 11 and the cover glass 71 by the light guide member 32. Accordingly, even if the peripheral edge of the display surface 12 of the TFT liquid crystal display 11 is covered with the bezel 13, the non-display part due to the bezel 13 can be covered with the sub-display area As. Accordingly, the non-display range (interval W) between the main display area Am displayed by the main display unit 10 and the sub-display area As displayed by the sub-display unit 20 can be narrowed, and a good seamless feeling can be obtained.

Further, the gradation portion 71a, which becomes thinner as getting away from the boundary BL, is provided in a position along the boundary BL with the sub-display area As in the main display area Am of the cover glass 71. Accordingly, display in the main display area Am is provided with a gradation that gradually becomes darker toward the sub-display area As, a boundary between the display in the main display area Am and the display in the sub-display area As is blurred, and a better seamless feeling can be obtained.

Further, the light guide member 32 is fitted into the recessed portion 54 formed in the case 31 in the protruding part of the light guide portion 23 between the edge portion of the TFT liquid crystal display 11 and the cover glass 71. Accordingly, the gap G between the cover glass 71 and the display surface 12 of the TFT liquid crystal display 11 can be narrowed, a step difference in display between the main display unit 10 and the sub-display unit 20 can be reduced, and a better seamless feeling can be obtained.

In the vehicle display device 100 according to the present embodiment, the light guide portion 23 includes the reflection sheet 33 disposed along a surface of the light emitting portion 42 of the light guide member 32 that is opposite to the display plate portion 22. Accordingly, light emitted from the light emitting portion 42 of the light guide member 32 can be reflected by the reflection sheet 33 and guided to the display plate portion 22.

Further, since the reflection sheet 33 extends on an inner surface on a main display area Am side in the recessed portion 54 of the case 31, light emitted from the light emitting portion 42 of the light guide member 32 can be reflected more efficiently and guided to the display plate portion 22.

In the present embodiment, since the case 31 that supports the light guide member 32 and the like is black, even if light enters the inside through the cover glass 71, reflection of the light on the case 31 can be reduced, and the boundary part of the edge portion of the case 31 and the case 31 itself can be prevented from being conspicuous.

Next, a vehicle display device according to a modification will be described.

The same components as those of the above-described embodiment are denoted by the same reference numerals, and description thereof is omitted.

Figure 5:
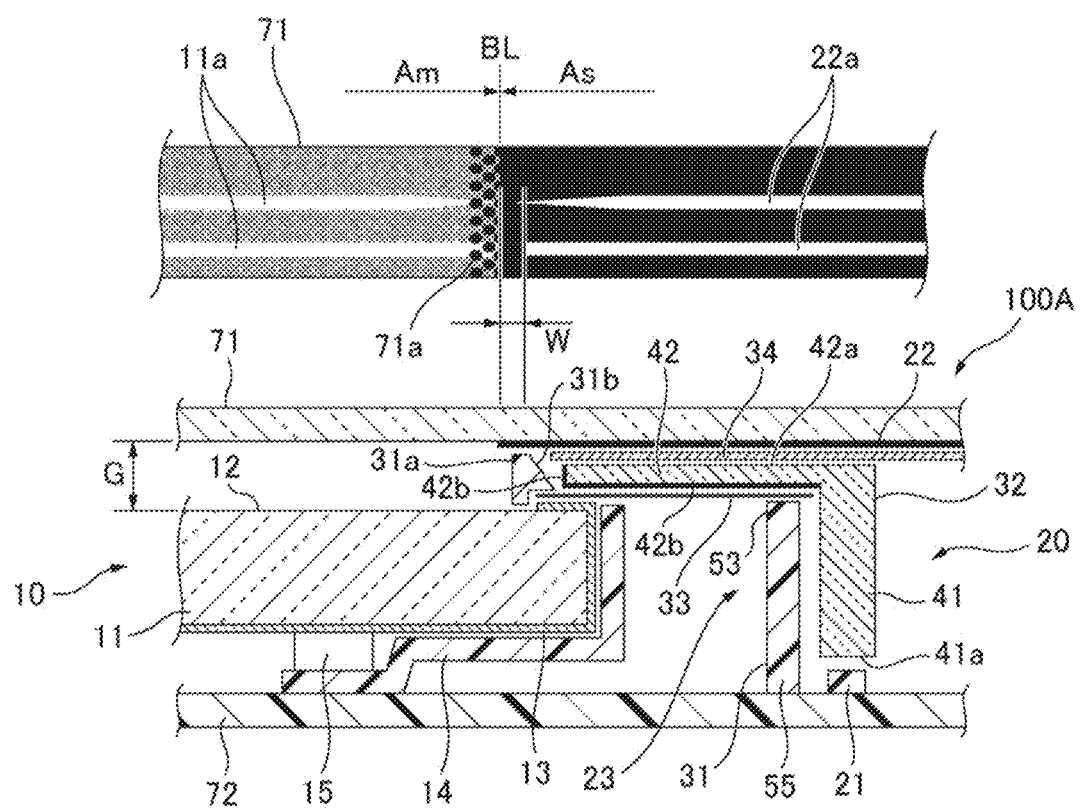
FIG. 5 schematically shows a plan view and a section of a vehicle display device according to a modification.
Figure 6:
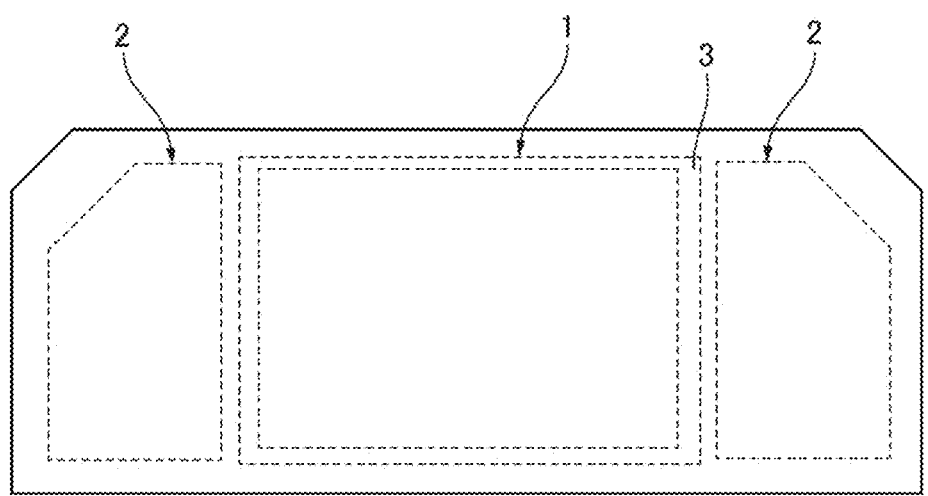
FIG. 6 is a schematic front view of a vehicle display device including a main display unit and sub-display units.

FIG. 5 schematically shows a plan view and a section of the vehicle display device according to the modification.

As shown in FIG. 5, in a portion of the light guide portion 23 that protrudes between the edge portion of the TFT liquid crystal display 11 and the cover glass 71 in a vehicle display device 100A according to the modification, a tapered surface 31b is provided on the edge portion 31a of the case 31. The tapered surface 31b is formed in an inner surface part of the recessed portion 54 formed in the mounting portion 50, and is inclined to the main display area Am side toward the cover glass 71.

In this manner, in the vehicle display device 100A according to the modification, since the tapered surface 31b is provided in the edge portion 31a of the case 31, light from the light emitting portion 42 is reflected by the tapered surface 31b and guided to the main display area Am. The light reflected by the tapered surface 31b, which is an inclined surface, and guided to the main display area Am becomes weaker toward the main display area Am. Accordingly, a gradation can be provided to luminance of the light, and a gradation effect of the display 22a of the sub-display area As can be enhanced. Accordingly, a better seamless feeling can be obtained between the image 11a of the main display area Am and the display 22a of the sub-display area As.

The present disclosure is not limited to the embodiment described above and can be appropriately modified, improved and the like. In addition, materials, shapes, sizes, numbers, arrangement positions and the like of components in the embodiment described above are freely selected and are not limited as long as the present disclosure can be implemented.

Here, features of the vehicle display device according to embodiment of the present disclosure described above are briefly summarized and listed in following [1] to [7].

[1] A vehicle display device (100, 100A) including:
a first display unit (main display unit 10) configured to display in a first display area (main display area Am) on a cover glass (71); and
at least one second display unit (sub-display unit 20) configured to display in a second display area (sub-display area As) adjacent to the first display area (main display area Am) on the cover glass (71), wherein
the first display unit (main display unit 10) includes an image display device (TFT Liquid crystal display 11) that displays an image on a display surface (12) of a surface,
the second display unit (sub-display unit 20) includes
a display plate portion (22) disposed along the second display area (sub-display area As) on the cover glass (71), and
a light guide portion (23) including a light guide member (32) that guides light from a light source (21) and radiates the light to the display plate portion (22),
the light guide member (32) of the light guide portion (23) is supported by a case (31), and protrudes between an edge portion of the image display device (TFT Liquid crystal display 11) and the cover glass (71), and
the cover glass (71) includes a gradation portion (71a) that is disposed in a position along a boundary (BL) with the second display area (sub-display area As) in the first display area (main display area Am) and becomes thinner as getting away from the boundary (BL).

According to the vehicle display device having the configuration of [1], the light of the light source can be guided between the image display device and the cover glass by the light guide member. Accordingly, for example, even when a peripheral edge of the display surface of the image display device is covered with the bezel, a non-display part due to the bezel can be covered with the second display area. Accordingly, a non-display range between the first display area displayed by the first display unit and the second display area displayed by the second display unit can be narrowed, and a good seamless feeling can be obtained.

Further, the gradation portion that becomes thinner as getting away from the boundary is provided in a position along the boundary with the second display area in the first display area of the cover glass. Accordingly, a gradation is provided to display in the first display area such that the display becomes darker toward the second display area, a boundary between the display in the first display area and the display in the second display area is blurred, and a better seamless feeling can be obtained.

[2] In the vehicle display device according to [1], the light guide member (32) is fitted into a recessed portion (54) formed in the case (31) in the protruding part between the image display device (TFT liquid crystal display 11) and the cover glass (71).

According to the vehicle display device having the configuration of [2], the light guide member is fitted into the recessed portion formed in the case in the protruding part of the light guide portion between the edge portion of the image display device and the cover glass. Accordingly, an interval between the cover glass and the display surface of the image display device can be narrowed, a level difference in display between the first display unit and the second display unit can be reduced, and a better seamless feeling can be obtained.

[3] In the vehicle display device according to [2], the light guide portion (23) includes a reflection sheet (33) disposed along a surface of the light guide member (32) that is opposite to the display plate portion (22).

According to the vehicle display device having the configuration of [3], the light emitted from the light guide member can be reflected by the reflection sheet and guided to the display plate portion.

[4] In the vehicle display device according to [3], the reflection sheet (33) extends on an inner surface on a first display area (main display area Am) side in the recessed portion (54) of the case (31).

According to the vehicle display device having the configuration of [4], since the reflection sheet extends on the inner surface on the first display area side in the recessed portion, the light emitted from the light guide member can be reflected more efficiently and guided to the display plate portion.

[5] In the vehicle display device according to [2], an inner surface on a first display area (main display area Am) side in the recessed portion (54) of the case (31) is a tapered surface (31b) that inclines to the first display area (main display area Am) side toward the cover glass (71).

According to the vehicle display device having the configuration of [5], the light emitted from the light guide member can be reflected by the tapered surface and guided to the first display area. The reflected light from the tapered surface becomes weaker toward the first display area. Accordingly, a gradation effect of the display of the second display area can be enhanced by giving a gradation to luminance of the light, and a better seamless feeling can be obtained.

[6] In the vehicle display device according to any one of [1] to [5], the light guide portion (23) includes a viewing angle control film (34) that is disposed on a display plate portion (22) side of the light guide member (32) and transmits light emitted from the light guide member (32) only to a driver side.

According to the vehicle display device having the configuration of [6], the light emitted from the light guide member can be transmitted only to the driver side by the viewing angle control film.

[7] In the vehicle display device according to any one of [1] to [6], the case (31) is black.

According to the vehicle display device having the configuration of [7], since the case supporting the light guide member is black, even when light enters inside through the cover glass, reflection of the light on the case can be reduced, and a boundary part of the edge portion of the case and the case itself can be prevented from being conspicuous.

What is claimed is:

1. A vehicle display device comprising:
   a first display unit configured to display in a first display area on a cover glass; and
   at least one second display unit configured to display in a second display area adjacent to the first display area on the cover glass, wherein
   the first display unit includes an image display device that displays an image on a display surface of a surface,
   the second display unit includes
      a display plate portion disposed along the second display area on the cover glass, and
      a light guide portion including a light guide member that guides light from a light source and radiates the light to the display plate portion,
   the light guide member of the light guide portion is supported by a case, and protrudes between an edge portion of the image display device and the cover glass, and
   the cover glass includes a gradation portion that is disposed in a position along a boundary with the second display area in the first display area and becomes thinner as getting away from the boundary.

2. The vehicle display device according to claim 1, wherein
   the light guide member is fitted into a recessed portion formed in the case in the protruding part between the image display device and the cover glass.

3. The vehicle display device according to claim 2, wherein
   the light guide portion includes a reflection sheet disposed along a surface of the light guide member that is opposite to the display plate portion.

4. The vehicle display device according to claim 3, wherein
   the reflection sheet extends on an inner surface on a first display area side in the recessed portion of the case.

5. The vehicle display device according to claim 2, wherein
   an inner surface on a first display area side in the recessed portion of the case is a tapered surface that inclines to the first display area side toward the cover glass.

6. The vehicle display device according to claim 1, wherein
   the light guide portion includes a viewing angle control film that is disposed on a display plate portion side of the light guide member and transmits light emitted from the light guide member only to a driver side.

7. The vehicle display device according to claim 1, wherein
   the case is black.

* * * * *